United States Patent [19]

Schlea, deceased

[11] 4,078,907
[45] Mar. 14, 1978

[54] SEPARATION AND PURIFICATION OF XENON

[75] Inventor: Carl Solomon Schlea, deceased, late of Aiken, S.C., by Esther Anna Wargowsky Schlea, executrix

[73] Assignee: The United States of America as represented by the United States Department of Energy, Washington, D.C.

[21] Appl. No.: 9,256

[22] Filed: Feb. 18, 1970

[51] Int. Cl.$^2$ .............................................. B01D 19/00
[52] U.S. Cl. .......................................... 55/37; 55/66; 176/37; 423/262
[58] Field of Search ...................... 55/37, 66; 176/37; 423/262

[56] References Cited

U.S. PATENT DOCUMENTS

| 2,284,662 | 6/1942 | Kahle | 55/66 |
| 3,063,217 | 11/1962 | Armond et al. | 55/66 |

FOREIGN PATENT DOCUMENTS

| 656,958 | 1/1963 | Canada | 55/66 |

Primary Examiner—Stephen J. Lechert, Jr.
Attorney, Agent, or Firm—Dean E. Carlson; Allen F. Westerdahl

[57] ABSTRACT

Xenon is separated from a mixture of xenon and krypton by extractive distillation using carbon tetrafluoride as the partitioning agent. Krypton is flushed out of the distillation column with $CF_4$ in the gaseous overhead stream while purified xenon is recovered from the liquid bottoms. The distillation is conducted at about atmospheric pressure or at subatmospheric pressure.

5 Claims, 1 Drawing Figure

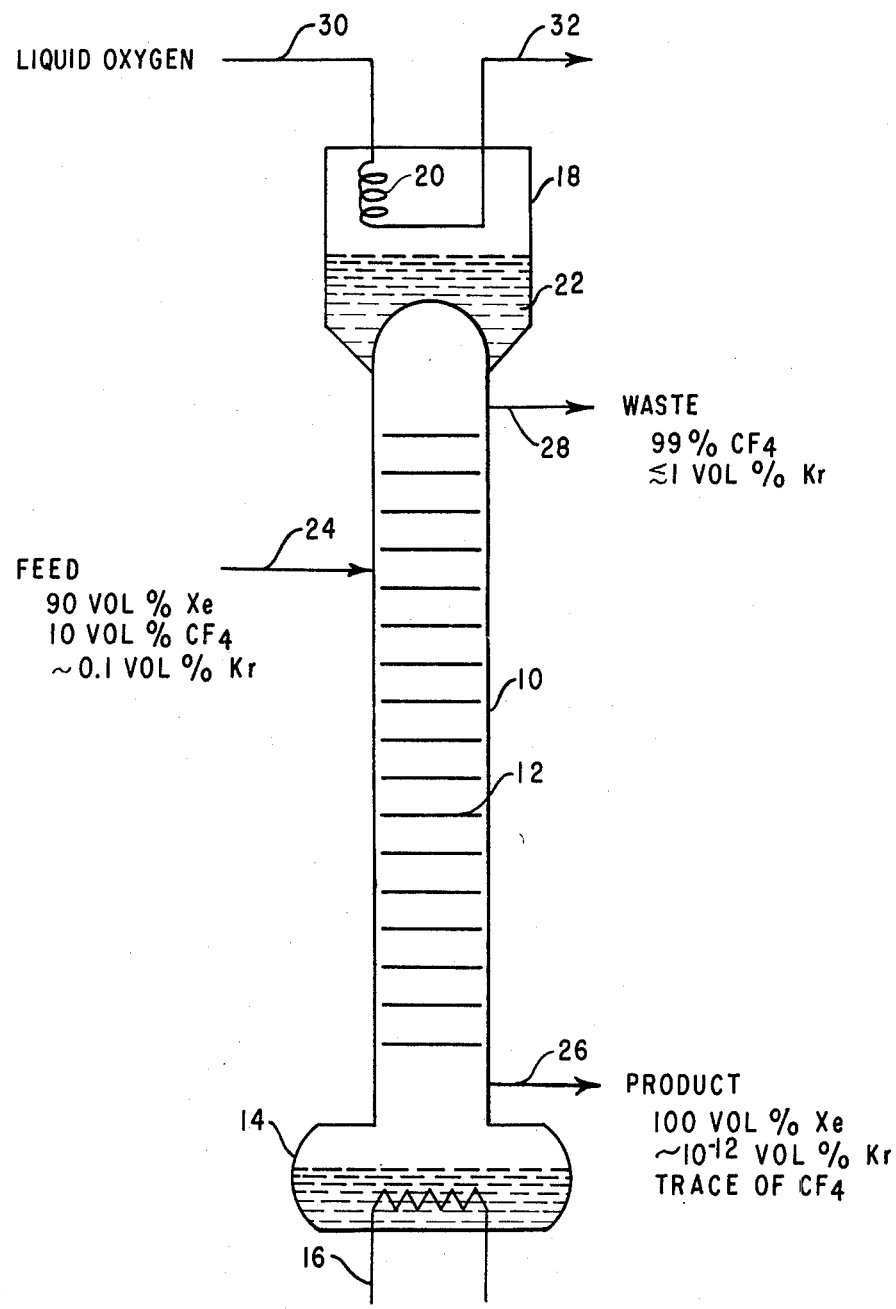

SEPARATION AND PURIFICATION OF XENON

BACKGROUND OF THE INVENTION

The invention described herein was made in the course of, or under a contract with the U. S. Atomic Energy Commission.

FIELD OF THE INVENTION

This invention relates to a process for the separation of xenon and krypton and more particularly to a process for the separation of pure xenon from a mixture of xenon and krypton by a fractional distillation technique.

DESCRIPTION OF THE PRIOR ART

The noble gases xenon and krypton are produced in sufficiently high yields (about 22% and 4%, respectively) in the fission of uranium-235 in nuclear reactors to be a significant source of these gases. About 25 liters (STP) per day of these gases are produced per 1000 megawatts of fission power. Since the xenon concentration in air is only $8.7 \times 10^{-6}$ vol %, 375 tons of air must be processed per day to obtain xenon at the rate that it is produced in a 1000 megawatt reactor. Therefore, fission product gas is an important potential source of xenon and krypton and could be valuable by-products of nuclear reactor operations.

The xenon isotopes produced by fission are stable and nonradioactive (except for those of short half-life that quickly decay). However, the krypton isotopes produced are radioactive and must be completely separated from the xenon in order for the xenon to be used. Thus, for the stable isotopes of fission product xenon ($^{131}$Xe, $^{134}$Xe and $^{136}$Xe) to be useful, the radiological hazard that is caused by trace quantities of the radioactive isotope krypton-85 (half-life 10.4 yr.) must be eliminated.

Heretofore, distillation techniques have been proposed for the separation and purification of the components of the xenon-krypton binary system. However, the prior art distillation methods require critical temperature control or must be conducted at superatmospheric pressure because, at atmospheric pressure, xenon has a range of less than 4° C between the freezing point and the boiling point (Xe: b.p. −108° C, f.p. −111.6° C). The difference between the freezing point and boiling point for krypton is also small, less than 5° C (Kr: b.p. −152° C, f.p. −156.7° C). Increasing the pressure on the mixture is one method of increasing the difference between the boiling point and freezing point of the mixture, but a large increase in pressure is necessary to provide a significant difference between the b.p. and f.p. Such a pressure increase also increases the hazards involved in handling radioactive materials and should be avoided if possible in separating fission product gases. Often a portion of the krypton is separated from the mixture by a preliminary separation which leaves impure xenon containing a small quantity of the hazardous krypton-85. To render the xenon free from krypton-85 contamination it is desirable to reduce the krypton concentration to less than about $10^{-12}$ vol %. To purify or decontaminate the xenon to such a low krypton concentration by conventional distillation requires elaborate and complex distillation equipment and refrigeration systems.

SUMMARY OF THE INVENTION

Accordingly, it is an object of the present invention to provide a process for the separation of xenon and krypton.

It is another object of the present invention to provide a process for the separation and purification of xenon from a mixture of xenon and krypton.

It is still another object of this invention to use fractional distillation techniques for the ultrapurification of xenon from a mixture of fission product xenon and krypton.

These and other objects are accomplished in the present invention by providing an improved distillation process operable at atmospheric or subatmospheric pressures, for the separation and purification of xenon from mixtures of xenon and krypton. It has been found that adding carbon tetrafluoride, as a third component, to the xenon-krypton binary system, prior to distillation, significantly increases the difference between the boiling and freezing temperatures of the mixture. Thus, the need for superatmospheric pressure and the attendant need for complex equipment are eliminated, and the potential radiation hazards are reduced.

While it is not intended that this invention be limited to any particular theory, the carbon tetrafluoride can be considered as an extractant or partitioning agent to flush krypton from the distillation column. Also, the xenon-krypton binary system is altered to provide a wide difference between the boiling and freezing temperatures of the components of the mixture in the distillation column.

The $CF_4$ (b.p. −127.7° C, f.p. −183.7° C) is added in sufficient quantity to alter the physical properties of the Xe-Kr binary system so that krypton is diluted and the distillation properties of the new system approach those of $CF_4$ rather than those of the noble gases.

This invention will be more fully understood by reference to the following detailed description of a preferred embodiment taken in conjunction with the appended drawing.

BRIEF DESCRIPTION OF THE DRAWING

The accompanying drawing shows the present process in conjunction with a schematic illustration of a distillation column. The approximate concentration of components are given for this exemplary embodiment.

DESCRIPTION OF A PREFERRED EMBODIMENT

The process of the present invention will now be described in detail with particular reference to the single figure of the drawing wherein is illustrated a distillation column comprising a conventional fractionating column 10, with a reboiler 14 and a condenser 18 disposed at the bottom and the top, respectively, of column 10.

The fractionating column 10 is constructed of a suitable material, resistant to corrosion by the fluoride ions and provided with suitable packing or plates 12. Column 10 is provided with a feed inlet 24 at a suitable point on the column, a product outlet 26 near the bottom, and a waste outlet 28 near the top of the column. Disposed at the bottom of column 10 is a reboiler 14 provided with suitable heater means 16. The number of plates 12 and position of the feed inlet 24, product outlet 26 and the waste outlet 28 will, of course, depend on a number of factors including the concentrations of the components, the relative ratio of components in the feed, the relative volatilities of the components and the extent of decontamination desired.

A condenser 18 is disposed on the top of the fractionating column 10 for condensing the overhead vapor ($CF_4$ with small quantities of Kr) in the column 10. To control the condensation of $CF_4$ vapor, a primary refrigerant 22, such as $CF_4$, is used in the condenser 18 in a closed system. The primary refrigerant 22 is maintained in liquid form by a secondary coolant, such as liquid oxygen, passing through the vapor phase of the primary refrigerant 22 in cooling coils 20. Liquid oxygen enters through coolant inlet 30 and after passing through the coils 20 leaves through coolant outlet 32. The temperature of the system can be conveniently controlled by varying the pressure in the condenser.

The operation of the distillation column and condenser of the type hereinabove described will be familiar to those skilled in the art. The feed for the process comprises a mixture of xenon and krypton, the product of preliminary separations, to which is added carbon tetrafluoride. Xenon and krypton are commonly recovered from the off-gas streams of nuclear reactors and nuclear fuel processing plants by adsorption on charcoal beds. Processes for the recovery of noble gases from off-gas streams are described in detail by G. W. Keilholtz, in "Removal of Radioactive Noble Gases from Off-Gas Streams", *Nuclear Safety*, 8 (2): 155-167 (Winter 1966-1967). Preliminary separation of xenon and krypton is then conducted by conventional batch distillation. After a preliminary separation, an impure xenon product, containing a small quantity of hazardous krypton-85, is used to make up the feed mixture for a final decontamination and purification of xenon. The feed mixture, including $CF_4$, enters the fractionating column 10 through feed inlet 24. The relative volatilities of the components of the feed mixture are in the approximate ratio $Kr:CF_4:Xe = 24:4:1$. The quantity of $CF_4$ that is added depends upon the quantity of krypton in the Xe-Kr mixture. Sufficient $CF_4$ is added to alter the physical properties of the Xe-Kr mixture so that krypton is thoroughly diluted and the distillation properties of the new mixture approach those of $CF_4$ rather than those of the noble gases. The distillation column is operated at nearly total reflux of carbon tetrafluoride. Xenon is enriched in the liquid phase and recovered as substantially pure Xe product from the product outlet 26. The xenon product contains only a trace of $CF_4$ and less than $10^{-12}$ vol % krypton. Krypton remains in the vapor phase (with $CF_4$) and is removed from the column 10 by bleeding a low flow of $CF_4$ from waste outlet 28 near the top of the column. Thus, krypton is flushed from the still at a low concentration to minimize the radiological hazards associated with the isotope $^{85}Kr$.

The following specific example further illustrates the process of the present invention.

EXAMPLE

Carbon tetrafluoride in the amount of 10 vol % is added to the product of a preliminary separation of fission product gases to form a feed mixture comprising about 90 vol % Xe, 10 vol % $CF_4$ and about 0.1 vol % Kr. This feed mixture is introduced into a one-inch diameter fractionating column having the equivalent of about 17 theoretical plates. The feed inlet is at a point equivalent to about 13 theoretical plates from the bottom of the column. The column is operated, as hereinabove described, at atmospheric pressure and at nearly total reflux of $CF_4$. The product, comprising substantially pure xenon with a trace of $CF_4$, is removed in the liquid phase at the product outlet. Krypton in the product xenon is reduced to less than $10^{-12}$ vol %. Sufficient $CF_4$ is bled from the waste outlet to flush krypton from the column in the amount of about one vol %. This waste stream is substantially free of xenon. The component concentrations of each stream for this example are shown in the appended drawing.

Using the process of the present invention, xenon is recovered from fission product gases in a commercially useful form that is free of hazardous isotopes of krypton ($^{85}Kr$), thereby eliminating the need for biological shielding. The use of $CF_4$ as the partitioning agent to flush krypton from the still permits fractional distillation with simplified temperature control at atmospheric or subatmospheric pressures.

The foregoing description and example are not intended to restrict the scope of the inventions and the invention should be construed as limited only as indicated by the appended claims.

What is claimed is:

1. A process for the separation and purification of xenon from a mixture of xenon and krypton which comprises adding carbon tetrafluoride to said mixture and subjecting said mixture to fractional distillation to recover said xenon substantially free of krypton.

2. The process of claim 1 wherein said carbon tetrafluoride is added to said mixture in sufficient quantity to substantially alter the distillation properties of said mixture.

3. The process of claim 1 wherein said carbon tetrafluoride is added to said mixture in the amount of about 10% by volume of said mixture.

4. The process of claim 1 wherein said distillation is carried out at about atmospheric pressure.

5. The process of claim 1 wherein said distillation is carried out at subatmospheric pressure.

* * * * *